US009251783B2

(12) United States Patent
Kalinli-Akbacak et al.

(10) Patent No.: US 9,251,783 B2
(45) Date of Patent: *Feb. 2, 2016

(54) SPEECH SYLLABLE/VOWEL/PHONE BOUNDARY DETECTION USING AUDITORY ATTENTION CUES

(71) Applicant: Sony Computer Entertainment, Inc., Tokyo (JP)

(72) Inventors: Ozlem Kalinli-Akbacak, Burlingame, CA (US); Ruxin Chen, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/307,426

(22) Filed: Jun. 17, 2014

(65) Prior Publication Data

US 2015/0073794 A1    Mar. 12, 2015

Related U.S. Application Data

(63) Continuation of application No. 13/078,866, filed on Apr. 1, 2011, now Pat. No. 8,756,061.

(51) Int. Cl.
*G10L 15/04* (2013.01)
*G10L 15/05* (2013.01)
(Continued)

(52) U.S. Cl.
CPC ............. *G10L 15/05* (2013.01); *G10L 15/04* (2013.01); *G10L 15/16* (2013.01); *G10L 15/24* (2013.01); *G10L 15/34* (2013.01); *G10L 25/03* (2013.01)

(58) Field of Classification Search
USPC .................................. 704/231–257, 270–275
See application file for complete search history.

(56) References Cited

U.S. PATENT DOCUMENTS

| 4,594,575 A | 6/1986 | Avery et al. |
| 4,696,041 A | 9/1987 | Sakata |

(Continued)

FOREIGN PATENT DOCUMENTS

| CN | 101315733 B | 6/2010 |
| JP | 02205897 | 8/1990 |

(Continued)

OTHER PUBLICATIONS

Chinese Office Action for CN Application No. 201180069832.3, dated Sep. 22, 2014.

(Continued)

*Primary Examiner* — Jesse Pullias
(74) *Attorney, Agent, or Firm* — Joshua D. Isenberg; JDI Patent

(57) ABSTRACT

In syllable or vowel or phone boundary detection during speech, an auditory spectrum may be determined for an input window of sound and one or more multi-scale features may be extracted from the auditory spectrum. Each multi-scale feature can be extracted using a separate two-dimensional spectro-temporal receptive filter. One or more feature maps corresponding to the one or more multi-scale features can be generated and an auditory gist vector can be extracted from each of the one or more feature maps. A cumulative gist vector may be obtained through augmentation of each auditory gist vector extracted from the one or more feature maps. One or more syllable or vowel or phone boundaries in the input window of sound can be detected by mapping the cumulative gist vector to one or more syllable or vowel or phone boundary characteristics using a machine learning algorithm.

22 Claims, 6 Drawing Sheets

(51) Int. Cl.
G10L 15/16 (2006.01)
G10L 15/24 (2013.01)
G10L 15/34 (2013.01)
G10L 25/03 (2013.01)

(56) References Cited

U.S. PATENT DOCUMENTS

| | | | |
|---|---|---|---|
| 4,975,960 A | 12/1990 | Petajan | |
| 4,979,212 A * | 12/1990 | Yamada et al. | 704/234 |
| 5,586,215 A | 12/1996 | Stork et al. | |
| 5,806,036 A | 9/1998 | Stork | |
| 5,852,669 A | 12/1998 | Eleftheriadis et al. | |
| 5,897,616 A | 4/1999 | Kanevsky et al. | |
| 5,940,794 A | 8/1999 | Abe | |
| 6,161,090 A | 12/2000 | Kanevsky et al. | |
| 6,185,529 B1 | 2/2001 | Chen et al. | |
| 6,243,683 B1 | 6/2001 | Peters | |
| 6,529,871 B1 | 3/2003 | Kanevsky et al. | |
| 7,117,157 B1 | 10/2006 | Taylor | |
| 7,165,029 B2 | 1/2007 | Nefian | |
| 7,209,883 B2 | 4/2007 | Nefian | |
| 7,454,342 B2 | 11/2008 | Nefian et al. | |
| 7,472,063 B2 | 12/2008 | Nefian et al. | |
| 7,742,914 B2 | 6/2010 | Kosek et al. | |
| 7,783,061 B2 | 8/2010 | Zalewski et al. | |
| 7,809,145 B2 | 10/2010 | Mao | |
| 7,962,341 B2 | 6/2011 | Braunschweiler | |
| 8,209,182 B2 | 6/2012 | Narayanan | |
| 8,463,719 B2 | 6/2013 | Lyon et al. | |
| 8,600,749 B2 | 12/2013 | Ljolje | |
| 8,676,574 B2 | 3/2014 | Kalinli | |
| 8,756,061 B2 | 6/2014 | Kalinli et al. | |
| 2001/0051871 A1 | 12/2001 | Kroeker | |
| 2002/0128827 A1 | 9/2002 | Bu et al. | |
| 2002/0135618 A1 | 9/2002 | Maes et al. | |
| 2003/0018475 A1 | 1/2003 | Basu et al. | |
| 2004/0231498 A1 | 11/2004 | Li et al. | |
| 2006/0025989 A1 | 2/2006 | Mesgarani et al. | |
| 2006/0239471 A1 | 10/2006 | Mao et al. | |
| 2007/0016426 A1 | 1/2007 | Hershey et al. | |
| 2008/0133228 A1 | 6/2008 | Rao | |
| 2008/0201134 A1 | 8/2008 | Iwakura et al. | |
| 2008/0201140 A1 | 8/2008 | Wells et al. | |
| 2008/0235582 A1 | 9/2008 | Zalewski et al. | |
| 2008/0249773 A1 | 10/2008 | Bejar et al. | |
| 2008/0262839 A1 | 10/2008 | Nonaka et al. | |
| 2009/0076817 A1 | 3/2009 | Jeon et al. | |
| 2009/0173216 A1 | 7/2009 | Gatzsche et al. | |
| 2009/0210220 A1 | 8/2009 | Mitsuyoshi et al. | |
| 2009/0265166 A1 | 10/2009 | Abe | |
| 2009/0313019 A1 | 12/2009 | Kato et al. | |
| 2010/0121638 A1 | 5/2010 | Pinson et al. | |
| 2010/0145695 A1 | 6/2010 | Jung et al. | |
| 2010/0280827 A1 | 11/2010 | Mukerjee et al. | |
| 2011/0004341 A1 | 1/2011 | Sarvadevabhatla et al. | |
| 2011/0009193 A1 | 1/2011 | Bond et al. | |
| 2011/0029314 A1 | 2/2011 | Lin et al. | |
| 2011/0075855 A1 | 3/2011 | Oh et al. | |
| 2011/0099009 A1 | 4/2011 | Zopf et al. | |
| 2011/0141258 A1 | 6/2011 | Song et al. | |
| 2011/0144986 A1 | 6/2011 | Yu et al. | |
| 2012/0197153 A1 | 8/2012 | Kraus et al. | |
| 2013/0144616 A1 | 6/2013 | Bangalore | |
| 2013/0262096 A1 | 10/2013 | Wilhelms-Tricarico et al. | |
| 2013/0304478 A1 | 11/2013 | Sun et al. | |
| 2014/0112556 A1 | 4/2014 | Kalinli-Akbacak | |
| 2014/0114655 A1 | 4/2014 | Kalinli-Akbacak | |
| 2014/0149112 A1 | 5/2014 | Kalinli-Akbacak | |

FOREIGN PATENT DOCUMENTS

| | | |
|---|---|---|
| JP | 05257496 | 10/1993 |
| JP | 2006031033 A | 2/2006 |
| RU | 2403626 C2 | 11/2010 |
| WO | 2012134541 A | 10/2012 |

OTHER PUBLICATIONS

Non-Final Office Action for U.S. Appl. No. 13/901,426, dated Oct. 8, 2014.

Non-Final Office Action for U.S. Appl. No. 13/655,834, dated Sep. 5, 2014.

Japanese Office Action for JP Patent Application No. 2014-502540, dated Mar. 6, 2015.

Notice of Allowance for U.S. Appl. No. 13/655,834, dated Jan. 2, 2015.

Notice of Allowance for U.S. Appl. No. 13/655,825, dated Jan. 21, 2015.

"Yoshio Matsumoto et al, ""An Algorithm for Real-time Stereo Vision Implementation of Head Pose and Gaze Direction Measurement"", IEEE International Conference on Automatic Face and Gesture Recognition—FGR, pp. 499-505, 2000".

Athanasios Nikolaidis et al, "Facial feature extraction and pose determination", Pattern Recognition, vol. 33 pp. 1783-1791, 2000.

Chi, Tai-Shih, Lan-Ying Yeh, and Chin-Cheng Hsu. "Robust emotion recognition by spectro-temporal modulation statisticfeatures." Journal of Ambient Intelligence and Humanized Computing 3.1 (2012): 47-60.

Chi, Tai-shih, Powen Ru, and Shihab A. Shamma. "Multi resolution spectrotemporal analysis of complex sounds." The Journal of the Acoustical Society of America 118.2 (2005): 887-906.

Chris Ziegler, "Tobii and Lenovo show off prototype eye-controlled laptop, we go eyes-on (video)" downloaded from the Internet, downloaded from <http://www.engadget.com/2011/03/01/tobii-and-lenovo-show-off-prototype-eye-controlled-laptop-we-go/>, Mar. 1, 2011.

Dagen Wang et al. "Robust Speech Rate Estimation for Spontaneous Speech", IEEE Transactions on Audio, Speech, and Language Processing, vol. 15, No. 8, Nov. 2007.

El Ayadi, Moataz, Mohamed S. Kamel, and Fakhri Karray. "Survey on speech emotion recognition: Features, classificationschemes, and databases." Pattern Recognition 44.3 (2011): 572-587.

Erik Murphy-Chutorian, "Head Pose Estimation in Computer Vision: A Survey", IEEE Transactions on Pattern Analysis and Machine Intelligence, vol. 31, No. 4, pp. 607-626, 2009.

Extended European Search Report dated Jul. 3, 2012 issued for European Patent Application No. 2162896.0.

Ezzat, Tony, Jake V. Bouvrie, and Tomaso Poggio. "Spectro-temporal analysis of speech using 2-d Gabor filters."Interspeech.2007.

Harding, Sue, Martin Cooke, and Peter Konig. "Auditory gist perception: an alternative to attentional selection of auditorystreams?" Attention in Cognitive Systems. Theories and Systems from an Interdisciplinary Viewpoint. Springer BerlinHeidelberg, 2007. 399-416.

He, Ling, et al. "Study of empirical mode decomposition and spectral analysis for stress and emotion classification in naturalspeech." Biomedical Signal Processing and Control 6.2 (2011): 139-146.

Henning Risvik, "Principal Component Analysis (PCA) & NIPALS algorithm", May 10, 2007, dowloaded from http://share.auditory.ru/2006/Ivan.Ignatyev/AD/pca_nipals.pdf.

IBM, "Cell Broadband Engine Architecture", Oct. 2007, downloaded from the web, https://www-01.ibm.com/chips/techlib/techlib.nsf/techdocs/1AEEE1270EA2776387257060006E61BA/$file/CBEA_v1.02_11Oct2007_pub.pdf.

International Search Report & Written Opinion in International Application No. PCT/US2011/052192 mailed Apr. 9, 2012.

International Search Report and Written Opinion for International Application No. PCT/US2013/064701, dated Feb. 20, 2014.

International Search Report and Written Opinion for International Application No. PCT/US2013/071337, dated Mar. 27, 2014.

International Search Report issued date Mar. 8, 2012 for International Application No. PCT/ US/2011/059004.

(56) References Cited

OTHER PUBLICATIONS

Intonation in linguistic: http://en.wikipedia.org/wiki/Intonation_(linguistics), downloaded from web Jun. 4, 2012.

Kalinli et al., 'Prominence detection using auditory attention cues and task-dependent high level information', IEEE, transaction on audio, speech, and language processing, vol. 17, No. 5 Jul. 2009.

Kalinli et al., Saliency-driven unstructured acoustic scene classification using latent perceptual indexing, IEEE, MMSP'09, Oct. 5-7, 2009.

Kalinli, Ozlem, and Shrikanth Narayanan. "A top-down auditory attention model for learning task dependent influences on prominence detection in speech." Acoustics, Speech and Signal Processing, 2008. ICASSP 2008. IEEE InternationalConference on. IEEE, 2008.

Kalinli, Ozlem, and Shrikanth S. Narayanan. "A saliency-based auditory attention model with applications to unsupervisedprominent syllable detection in speech." Interspeech. 2007.

Kayser, Christoph, et al. "Mechanisms for allocating auditory attention: an auditory saliency map." Current Biology 15.21 (2005):1943-1947.

Non Final Office Action dated Sep. 17, 2013 issued for U.S. Appl. No. 13/078,866.

Non Final Office Action for U.S. Appl. No. 12/943,774, dated Jul. 1, 2013.

Non-Final Office Action for U.S. Appl. No. 13/655,825, dated Aug. 26, 2014.

Qiang Ji et al, "3D face pose estimation and tracking from a monocular camera" in Image Vision and Computing, vol. 20m Issue 7, May 1, 2002, pp. 499-511.

Schuller, Bjorn, et al. "Recognising realistic emotions and affect in speech: State of the art and lessons learnt from the firstchallenge." Speech Communication 53.9 (2011): 1062-1087.

T. Nagarajan et al. "Segmentation of speech into syllable-like units", Department of Computer Science and Engineering Indian Institute of Technology, Madras, Eurospeech 2003—Geneva.

Tone in linguistic: http://en.wikipedia.org/wiki/Tone_(linguistics), downloaded from web Jun. 4, 2012.

Wu, Siqing, Tiago H. Falk, and Wai-Yip Chan. "Automatic speech emotion recognition using modulation spectral features." Speech Communication 53.5 (2011): 768-785.

Final Office Action for U.S. Appl. No. 13/901,426, dated Apr. 24, 2015.

\* cited by examiner

SPEECH SYLLABLE/VOWEL/PHONE BOUNDARY DETECTION USING AUDITORY ATTENTION CUES

CLAIM OF PRIORITY

This application is a Continuation of U.S. patent application Ser. No. 13/078,866, filed Apr. 1, 2011, the entire contents of which are incorporated herein by reference.

FIELD OF THE INVENTION

Embodiments of the present invention are related to spoken language processing and more specifically to the detection of phone, vowel or syllable boundaries in speech using auditory attention cues with or without other traditional speech features.

BACKGROUND OF THE INVENTION

Speech recognition systems have become a common form of input for computer systems. A typical speech recognition system captures an audible signal and analyzes for recognizable components of human speech. Segmentation of speech into units, such as phonemes, syllables or vowels, provides information about both phonological and rhythmic aspects of speech. Phonemes (sometimes called phones) are generally regarded as the minimal meaningful phonological segment of speech. Phonemes include vowels and consonants. The term syllable is used to describe a segment of speech consisting of vowels alone or of consonants preceding or following. Usually vowels constitute the syllable nucleus. Detection of phone, vowel, and syllable boundary therefore plays an important role in speech recognition and natural language understanding. In many spoken language processing applications it is useful to determine where a syllable begins and ends within a sample speech signal. Since a spoken syllable typically includes a vowel portion as the syllable nucleus and may or may not include a consonant portion an important key to syllable boundary detection is therefore detection of the vowel and/or vowel boundary within a syllable. A phoneme boundary can be detected after the vowel or syllable boundary is detected by using more traditional features, such as energy, voice probability, zero crossing, spectral change rate at different FFT frequency bin, cepstrum, delta cepstrum, and delta-delta cepstrum, frame based phoneme probability, lip movement by analysis video image of the lips, with or without auditory attention cues. Researchers have found supporting arguments indicating that syllables are one of the most important elements in human speech perception. Segmentation of speech into syllabic units provides insights regarding speech rate, rhythm, prosody, and speech recognition and speech synthesis. A syllable contains a central peak of sonority (syllable nucleus), which is usually a vowel, and the consonants that cluster around this central peak. Most of the work in the literature focuses on syllable nucleus detection since it is more reliable and easier to locate compared to precise syllable boundaries. For syllable nucleus detection, most of the existing methods rely on estimating a one-dimensional continuous curve from extracted short-time acoustic features and performing a peak search on the curve to locate syllable nuclei. Some of the acoustic features that are used to locate syllable nuclei include energy in selected critical bands, linear predictive coding spectra, sub band-based correlation, pitch, voicing, etc. Some examples of state-of-the art work in this field include:

"Robust Speech Rate Estimation for Spontaneous Speech", Dagen Wang and Shrikanth S. Narayanan, in IEEE TRANSACTIONS ON AUDIO, SPEECH, AND LANGUAGE PROCESSING, VOL. 15, NO. 8, NOVEMBER 2007, pp 2190-2201.

"Segmentation of Speech into Syllable-like units" T. Nagarajan et al, EUROSPEECH 2003—GENEVA, pp 2893-2896.

"Speech rhythm guided syllable nuclei detection", Y. Zhang and J. Glass, Proceedings of the IEEE International Conference on Acoustics, Speech, and Signal Processing, pp 3797-3800, Taipei, Taiwan April 2009.

Usually these traditional methods require tuning lots of parameters, which is not desirable since it makes it hard to use them for different settings or conditions; i.e. new data, new conditions such as speaking style, noise conditions etc. In addition, the traditional methods usually focus on vague syllable nuclei detection It is within this context that embodiments of the present invention arise.

BRIEF DESCRIPTION OF THE DRAWINGS

Embodiments of the present invention can be readily understood by referring to the following detailed description in conjunction with the accompanying drawings.

DESCRIPTION OF THE SPECIFIC EMBODIMENTS

Embodiments of the present invention relate to spoken language processing methods and apparatus that use auditory attention cues for syllable/vowel/phone boundary detection in speech. Unlike traditional methods that focus on vague syllable nuclei detection, embodiments of the present invention can obtain a more detailed syllable/vowel/phone boundary information at frame-level. Different than traditional methods, methods and systems according to embodiments of the present invention use auditory attention cues for phone boundary, vowel boundary and/or syllable boundary detection in speech. The attention features are biologically inspired and capture the signal characteristic changes in sound by using two-dimensional spectro-temporal filters; hence successfully detects vowel and/or syllables in speech. In addition, the auditory attention features can be combined with the traditional speech features for phone/vowel/syllable boundary detection.

Figure 1A:
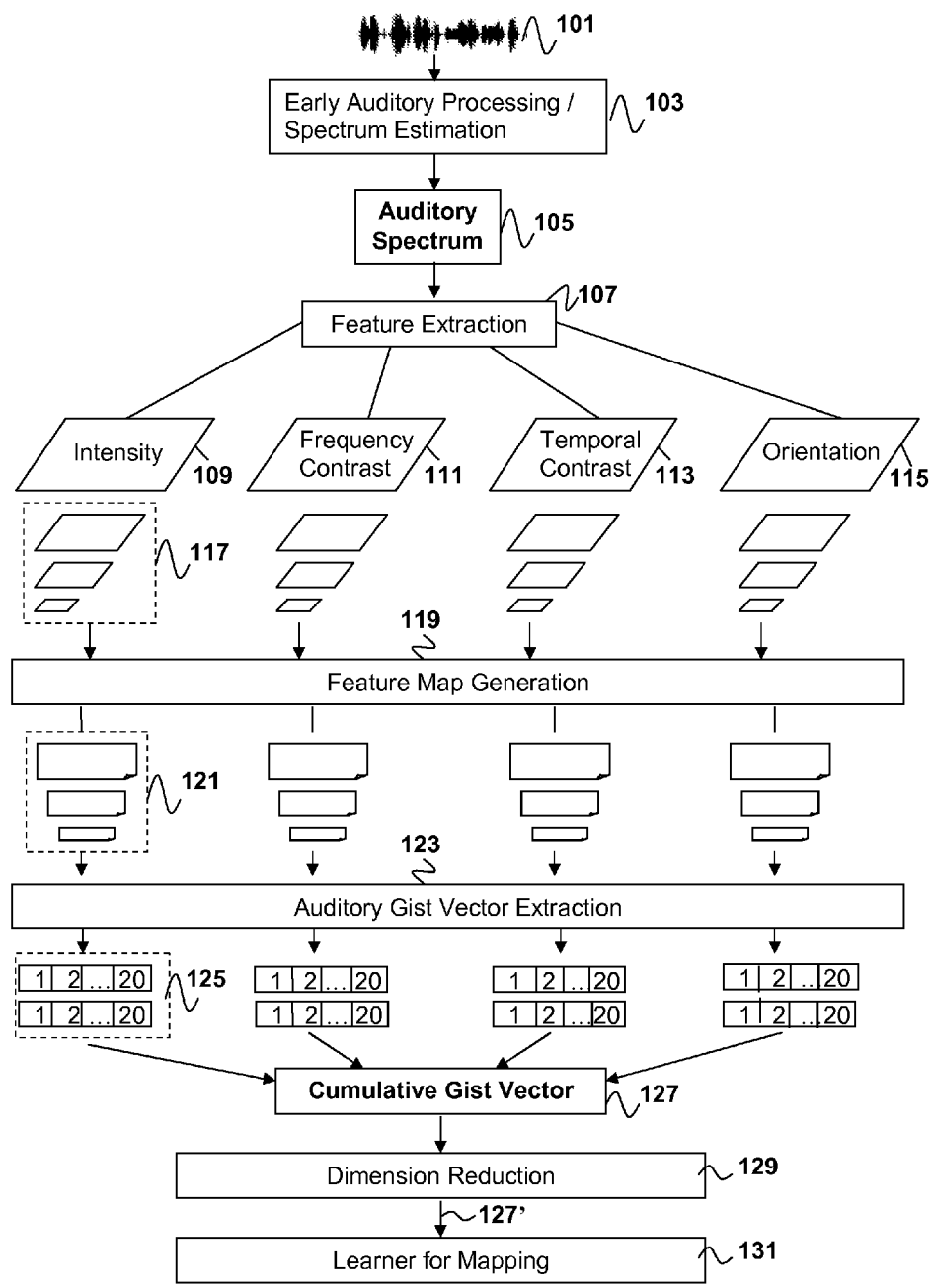
FIG. 1A is a flow diagram illustrating a method for syllable/vowel/phone boundary detection in speech according to an embodiment of the present invention.
Figures 1B, 1C:
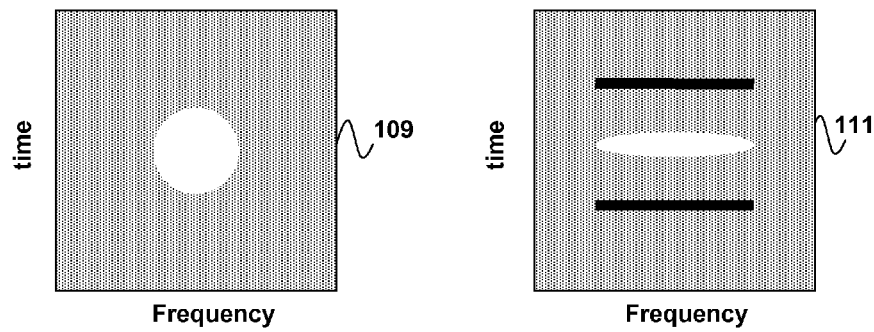
FIGS. 1B-1F are schematic diagrams illustrating examples of spectro-temporal receptive filters that can be used in embodiments of the present invention.

FIG. 1A is a flow diagram illustrating a method for syllable/vowel/phone boundary detection in speech using auditory attention cues according to an embodiment of the present invention. The auditory attention model is biologically inspired and mimics the processing stages in the human auditory system. It is designed to determine when and where sound signals attract human attention.

Initially an input window of sound 101 is received. By way of example, and not by way of limitation, this input window of sound 101 may be captured over a time window of some finite duration using a microphone which acts to convert the acoustic waves that characterize a particular input window of sound 101 into an electric signal for further processing. The input window of sound 101 may be any segment of a person's speech. By way of example, and not by way of limitation, the input window of sound 101 may contain a single syllable, word, sentence, or any combination of these.

The input window of sound 101 is then passed through a set of processing stages 103 that operate to convert this window of sound 101 into an audio spectrum 105. These processing stages 103 can be based on the early processing stages of an auditory system, such as the human auditory system. By way of example, and not by way of limitation, the processing stages 103 may consist of cochlear filtering, inner hair cell, and lateral inhibitory stages mimicking the process from basilar membrane to the cochlear nucleus in the auditory system. The cochlear filtering may be implemented using a bank of 128 overlapping constant-Q asymmetric band pass filters with center frequencies that are uniformly distributed along a logarithmic frequency axis. These filters may be implemented by suitably configured electronic hardware, which may be purpose-built. Alternatively, the filters may be implemented on a general-purpose computer programmed with software that implements the functions of the filters. For analysis, 20 ms frames of audio with 10 ms shift can be used, which result in each audio frame being represented by a 128 dimensional vector.

Once the input window of sound 101 has been converted into an auditory spectrum 105, the spectrum 105 is analyzed by extracting multi-scale features 117, as indicated at 107, by mimicking the information processing stages in the central auditory system. Auditory attention can be captured by or voluntarily directed to a wide variety of acoustical features such as intensity (or energy), frequency, temporal, pitch, timbre, FM direction or slope (called "orientation" here), etc. These features can be selected and implemented to mimic the receptive fields in the primary auditory cortex.

By way of example, and not by way of limitation, four features that can be included in the model to encompass the aforementioned features are intensity (I), frequency contrast (F), temporal contrast (T), and orientation ($O_\theta$) with $\theta = \{45°, 135°\}$. The intensity feature captures signal characteristics related to the intensity or energy of the signal. The frequency contrast feature captures signal characteristics related to spectral (frequency) changes of the signal. The temporal contrast feature captures signal characteristics related to temporal changes in the signal. The orientation filters are sensitive to moving ripples in the signal.

Each feature may be extracted using two-dimensional spectro-temporal receptive filters 109, 111, 113, 115, which mimic the certain receptive fields in the primary auditory cortex. FIGS. 1B-1F respectively illustrate examples of the receptive filters (RF) 109, 111, 113, 115. Each of the receptive filters (RF) 109, 111, 113, 115 simulated for feature extraction is illustrated with gray scaled images corresponding to the feature being extracted. An excitation phase 110 and inhibition phase 112 are shown with white and black color, respectively.

Each of these filters 109, 111, 113, 115 is capable of detecting and capturing certain changes in signal characteristics. For example, the intensity filter 109 illustrated in FIG. 1B may be configured to mimic the receptive fields in the auditory cortex with only an excitatory phase selective for a particular region, so that it detects and captures changes in intensity/energy over the duration of the input window of sound. Similarly, the frequency contrast filter 111 depicted in FIG. 1C may be configured to correspond to receptive fields in the primary auditory cortex with an excitatory phase and simultaneous symmetric inhibitory sidebands. The temporal contrast filter 113 illustrated in FIG. 1D may be configured to correspond to the receptive fields with an inhibitory phase and a subsequent excitatory phase.

Figures 1D, 1E:
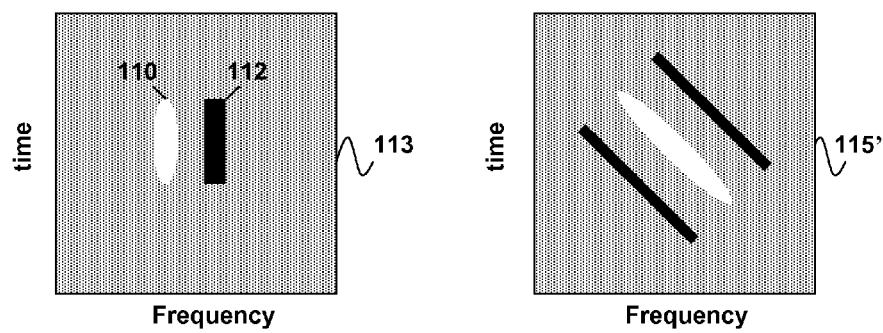
Figure 1F:
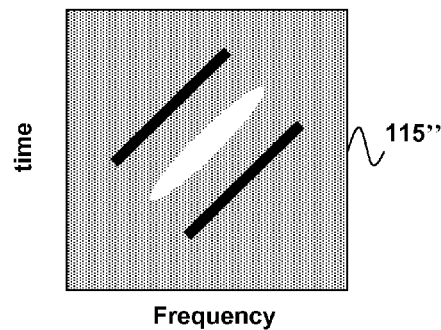

It can be thought that the auditory spectrum is analogous to an image of a scene in vision and some of these features are tuned to different local oriented edges; i.e. frequency contrast features are tuned to local horizontally oriented edges, which can be good for detecting and capturing formants and their changes. In other words, the frequency contrast filter 111 shown in FIG. 1C detects and captures spectral changes over the duration of the sound window. The temporal contrast filter 113 shown in FIG. 1D detects and captures changes in the temporal domain. The orientation filters 115' and 115" mimic the dynamics of the auditory neuron responses to moving ripples. The orientation filter 115' can be configured with excitation and inhibition phases having 45° orientation as shown in FIG. 1E to detect and capture when ripple is moving upwards. Similarly, the orientation filter 115" can be configured with excitation and inhibition phases having 135° orientation as shown in FIG. 1F to detect and capture when ripple is moving downwards. One important point is that in the model the feature contrast is computed rather than the absolute feature strength, which is crucial for change point/boundary detection and segmentation.

The RF for generating frequency contrast 111, temporal contrast 113 and orientation features 115 can be implemented using two-dimensional Gabor filters with varying angles. The filters used for frequency and temporal contrast features can be interpreted as horizontal and vertical orientation filters, respectively, and can be implemented with two-dimensional Gabor filters with 0° and 90°, orientations. Similarly, the orientation features can be extracted using two-dimensional Gabor filters with $\{45°, 135°\}$ orientations. The RF for generating the intensity feature 109 is implemented using a two-dimensional Gaussian kernel.

The feature extraction 107 is completed using a multi-scale platform. The motivation for generating a scale-space representation of a given data set originates from the basic observation that objects are composed of different structures at different scales. For a system analyzing an unknown set of data, there is no way to know a priori what scales are appropriate for describing the interesting structures associated with the data. The only reasonable approach is thus to consider descriptions at multiple scales in order to capture the unknown scale variations that may occur. In embodiments of the present invention, the multi-scale features 117 may be obtained using a dyadic pyramid (i.e., the input spectrum is filtered and decimated by a factor of two, and this is repeated). As a result, eight scales are created (if the window duration is larger than 1.28 seconds, otherwise there are fewer scales), yielding size reduction factors ranging from 1:1 (scale 1) to 1:128 (scale 8).

After multi-scale features 117 are obtained, feature maps 121 are generated as indicated at 119 using those multi-scale features 117. This is accomplished by computing "center-surround" differences, which involves comparing "center" (fine) scales with "surround" (coarser) scales. The center-surround operation mimics the properties of local cortical inhibition and detects the local temporal and spatial discontinuities. It is simulated by across scale subtraction ($\theta$) between a "center" fine scale (c) and a "surround" coarser scale (s), yielding a feature map $M(c,s):M(c,s)=|M(c)\theta M(s)|$, $M \in \{I, F, T, O_\theta\}$. The across scale subtraction between two scales is computed by interpolation to the finer scale and point-wise subtraction. By way of example, and not by way of limitation, $c=\{2, 3, 4\}$, $s=c+\delta$, with $\delta \in \{3, 4\}$ may be used, which results in a total of 30 feature maps when features are extracted at eight scales.

Next, an "auditory gist" vector 125 is extracted as indicated at 123 from each feature map 121 of I, F, T, $O_\theta$, such that the sum of auditory gist vectors 125 covers the entire input sound window 101 at low resolution. To determine the auditory gist vector 125 for a given feature map 121, the feature map 121 is first divided into an m-by-n grid of sub-regions, and statistics, such as maximum, minimum, mean, standard deviation etc., of each sub-region can be computed. By way of example, and not by way of limitation, the mean of each sub-region can be computed to capture the overall properties of the map. For a feature map $M_i$, with height h and width w, the computation of the auditory gist vector can be written as:

$$G_i^{k,l} = \frac{mn}{wh} \sum_{u=\frac{kw}{n}}^{\frac{(k+1)w}{n}-1} \sum_{v=\frac{lh}{m}}^{\frac{(l+1)h}{m}-1} M_i(u, v),$$

for
$$k = \{0, \ldots, n-1\}, l = \{0, \ldots, m-1\}.$$

An example of auditory gist vector extraction 123 with m=4, n=5 is shown in FIG. 1, where a 20-dimensional auditory gist vector 125 is shown to represent a feature map. These particular values of m and n are provided as for the sake of example and not as limitations on any embodiment of the invention.

After extracting an auditory gist vector 125 from each feature map 121, the auditory gist vectors are augmented and combined to create a cumulative gist vector 127. The cumulative gist vector 127 may additionally undergo a dimension reduction 129 technique to reduce dimension and redundancy in order to make syllable/vowel/phone boundary detection more practical. By way of example and not by way of limitation, principal component analysis (PCA) can be used for the dimension reduction 129. The result of the dimension reduction 129 is a final feature, referred to herein as an auditory gist feature 127' that conveys the information in the cumulative gist vector 127 in fewer dimensions. PCA is commonly used as a primary technique in pattern recognition. As is generally understood, PCA is mathematically defined as an orthogonal linear transformation that transforms data to a new coordinate system such that the greatest variance by any projection of the data comes to lie on the first coordinate (called the first principal component), the second greatest variance on the second coordinate, and so on. PCA may be implemented on a computer programmed with suitably configured software. Examples of commercially available software that can implement dimension reduction through PCA include Matlab by MathWorks, Inc. of Natick, Mass., U.S.A. or Weka machine learning software, developed at the University of Waikato, New Zealand. Alternatively, other linear and nonlinear dimension reduction techniques, such as factor analysis, kernel PCA, linear discriminant analysis (LDA) and the like, may be used to implement the dimension reduction 129.

Finally, after the auditory gist feature 127' that characterizes the input sound window 101 has been determined, phone boundaries, vowel boundaries, syllable nucleus, or syllable boundaries may be detected from the auditory gist feature. To perform such detection on a given input sound window, a machine learning algorithm 131, such as neural networks, nearest neighbor classifiers, decision trees, etc, can be used to discover the mapping between cumulative gist vectors 127 and the phone boundaries, vowel boundaries, syllable nucleus, or syllable boundaries. By way of example and not by way of limitation, a neural network can be used as the machine learning algorithm 131 since it is biologically well motivated. In such a case, the neural network 131 can identify the phone boundaries, vowel boundaries, syllable nucleus, or syllable boundaries within the input sound given the cumulative gist vector it is associated with.

As used herein, the term "neural network" refers to an interconnected group of natural or artificial neurons that uses a computational/mathematical model for information processing based on a connectionistic approach to computation. Neural networks are adaptive systems that change structure based on external or internal information that flows through the network. They are used to implement non-linear statistical data modeling and may be used to model complex relationships between inputs and outputs. In embodiments of the present invention, the neural network can be used for learning mapping between a group of auditory gist features represented by a cumulative auditory gist vector 127 or auditory gist feature 127' and one or more phone boundaries, vowel boundaries, syllable nucleus, or syllable boundaries. By way of example, and not by way of limitation, a 3-layer neural network may be used. The neural network may have D inputs, (D+N)/2 hidden nodes and N output nodes, where D is the length of the auditory gist feature after PCA dimension reduction and N is the number of classes to be distinguished; i.e. for phone/vowel/syllable boundary detection N can be equal to two for deciding if a frame is a boundary or not.

The neural network output estimate can be used in two ways: i) hard decision ii) soft decision. In hard decision, the neural network's final decision is used as a binary decision; e.g., if there is a boundary at a frame, then it outputs one, otherwise zero. In the soft decision, the neural network probability score, which is a value between [0,1], can be used as a posterior probability of the current frame being a boundary given the attention features. Also, in the soft decision, the estimated posterior probability can be fed into another system and combined with information from another source to further improve either system's performance. For example, boundary information can be used to improve speech recognition performance or complementary information from a speech recognition engine can be used to further improve the boundary detection performance, etc. In addition, certain embodiments of the present invention can optionally also provide information about the number of syllables in a segment; e.g., the number of syllables per second or per utterance, which can be used for estimating a speaking rate. Then, the estimated speaking rate can be used to improve other spoken language processing applications such as; to improve speech recognition performance by selecting appropriate acoustic models based on the speech rate, or finding emotional segments of speech, etc.

The syllable/phone/vowel boundary information can be used alone or to improve other spoken language processing systems such as speech recognition. Also, one can think the phone/vowel/syllable boundary as a hierarchical system. Information from one type of boundary can also be used to improve another type of boundary; i.e. vowel boundary information can be used to improve phone or syllable boundary detection. Also, embodiments of the present invention can be used for analysis of all types of speech and speaking styles and noise conditions; i.e. isolated speech, continuous speech, spontaneous speech, read speech, clean/noisy speech etc.

Figure 1G:
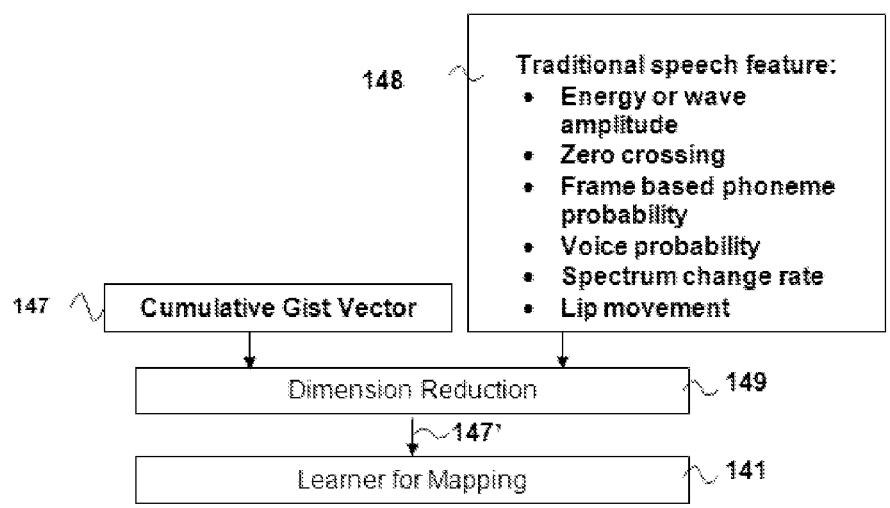
FIG. 1G is a flow diagram illustrating a method for syllable/vowel/phone boundary detection in speech by using a combination of traditional speech feature and cumulative gist vector according to an embodiment of the present invention.

FIG. 1G is a flow diagram illustrating a method 140 for syllable/vowel/phone boundary detection in speech using auditory attention cues as well as traditional speech features according to an alternative embodiment of the present invention. In the method 140. a cumulative gist vector 147 may be generated from analysis of an input sound window, e.g., as described above with respect to FIG. 1A. In addition, conventional speech features 148 may be generated from conventional analysis the same input sound window using conventional methods. By way of example, and not by way of limitation, the conventional features may include, but are not limited to frame-based energy, frame-based maximum speech amplitude, zero crossing rate, frame-based phoneme probability, frame-based voice probability, spectrum change rate at different FFT frequency bin, cepstrum and delta cepstrum and delta delta cepstrum, lip movement captured from video.

The cumulative gist vector 147 and the traditional features 148 can be used as an input for a dimensional reduction module 149, which may reduce dimension and redundancy in these inputs to make syllable/vowel/phone boundary detection more practical. The dimensional reduction module 149 may operate as described above with respect to dimension reduction 129 in FIG. 1A. By way of example and not by way of limitation, the dimension reduction module 149 may implement principal component analysis (PCA) to reduce the dimensions of the cumulative gist vector 147 and traditional features 148. The output of the dimension reduction module 149 is an auditory gist feature 147' that conveys the information in the cumulative gist vector 147 and traditional features 148 in fewer dimensions and characterizes the input sound window. The auditory gist feature 147' may have features in common with the auditory gist feature 127' described above with respect to FIG. 1A.

Phone boundaries, vowel boundaries, syllable nucleus, or syllable boundaries may be detected from the auditory gist feature vector 147', e.g., using a machine learning algorithm 141 to discover the mapping between cumulative gist vector 147 and or traditional features 148 and the phone boundaries, vowel boundaries, syllable nucleus, or syllable boundaries. The machine learning algorithm may have features in common with the machine learning algorithm 131 of FIG. 1A. By way of example, and not by way of limitation, the machine learning algorithm 141 may use neural networks, nearest neighbor classifiers, decision trees, and the like.

Figure 2:
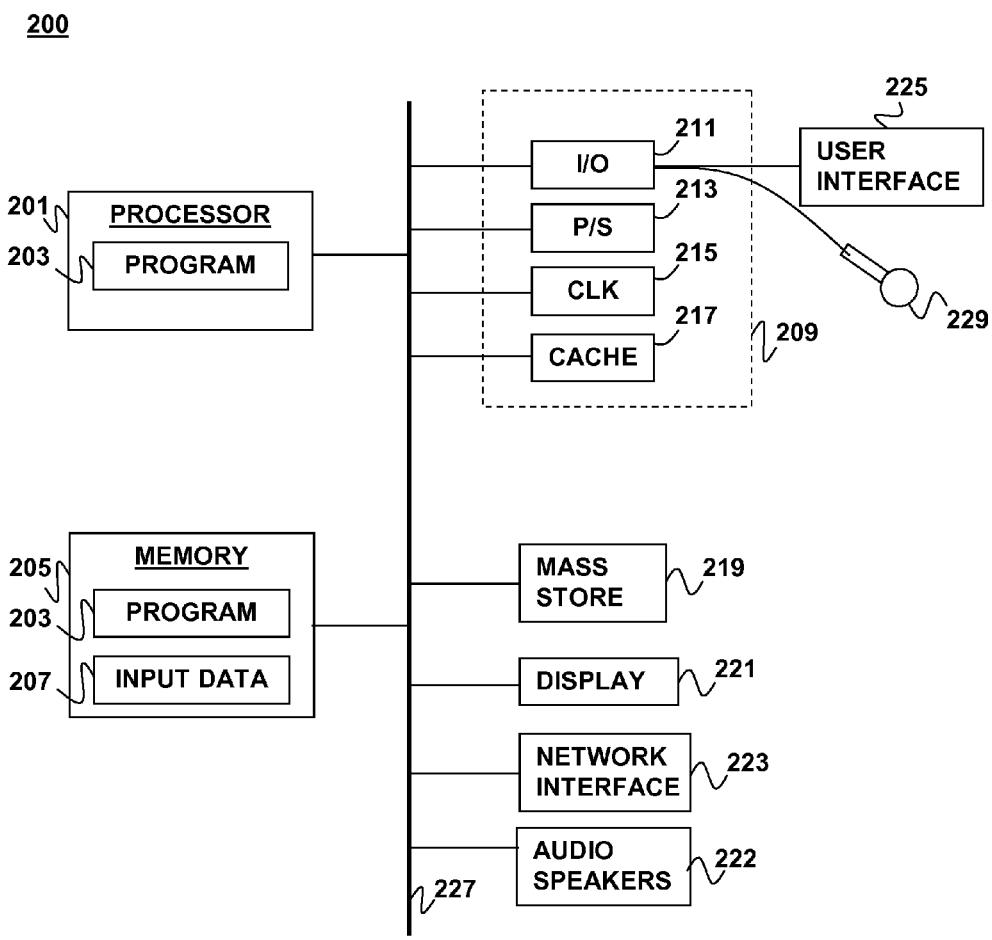
FIG. 2 is a block diagram illustrating an apparatus for syllable/vowel/phone boundary detection in speech according to an embodiment of the present invention

Embodiments of the invention may be implemented on a suitably configured computer apparatus. FIG. 2 illustrates a block diagram of a computer apparatus that may be used to implement a method of phone/syllable/vowel boundary detection using auditory attention cues according to an embodiment of the present invention. The apparatus 200 generally may include a processor module 201 and a memory 205. The processor module 201 may include one or more processor cores. An example of a processing system that uses multiple processor modules, is a Cell Processor, examples of which are described in detail, e.g., in Cell Broadband Engine Architecture, which is available online at http://www-306.ibm.com/chips/techlib/techlib.nsf/techdocs/1AEEE1270EA2776387257060006E61B A/$file/CBEA_01_pub.pdf, which is incorporated herein by reference.

The memory 205 may be in the form of an integrated circuit, e.g., RAM, DRAM, ROM, and the like. The memory 205 may also be a main memory that is accessible by all of the processor modules. In some embodiments, the processor module 201 may have local memories associated with each core. A program 203 may be stored in the main memory 205 in the form of processor readable instructions that can be executed on the processor modules. The program 203 may be configured to perform syllable/vowel boundary detection on a window of sound using auditory attention cues. The program 203 may be written in any suitable processor readable language, e.g., C, C++, JAVA, Assembly, MATLAB, FORTRAN, and a number of other languages. Input data 207 may also be stored in the memory. Such input data 207 may include input windows of sound, feature maps, or auditory gist vectors. During execution of the program 203, portions of program code and/or data may be loaded into the memory or the local stores of processor cores for parallel processing by multiple processor cores.

The apparatus 200 may also include well-known support functions 209, such as input/output (I/O) elements 211, power supplies (P/S) 213, a clock (CLK) 215, and a cache 217. The apparatus 200 may optionally include a mass storage device 219 such as a disk drive, CD-ROM drive, tape drive, or the like to store programs and/or data. The device 200 may optionally include a display unit 221, audio speakers unit 222, and user interface unit 225 to facilitate interaction between the apparatus and a user. The display unit 221 may be in the form of a cathode ray tube (CRT) or flat panel screen that displays text, numerals, graphical symbols or images. The user interface 225 may include a keyboard, mouse, joystick, light pen, or other device that may be used in conjunction with a graphical user interface (GUI). The apparatus 200 may also include a network interface 223 to enable the device to communicate with other devices over a network, such as the internet.

In some embodiments, the system 200 may include an optional microphone 229, which may be a single microphone or a microphone array. The microphone 229 can be coupled to the processor 201 via the I/O elements 211. By way of example, and not by way of limitation, different input windows of sound may be recorded using the microphone 229.

The components of the system 200, including the processor 201, memory 205, support functions 209, mass storage device 219, user interface 225, network interface 223, and display 221 may be operably connected to each other via one or more data buses 227. These components may be implemented in hardware, software or firmware or some combination of two or more of these.

There are a number of additional ways to streamline parallel processing with multiple processors in the apparatus. For example, it is possible to "unroll" processing loops, e.g., by replicating code on two or more processor cores and having each processor core implement the code to process a different piece of data. Such an implementation may avoid a latency associated with setting up the loop. As applied to embodiments of the present invention, multiple processors could extract different features from an input sound window in parallel. The intensity extraction filter, frequency contrast extraction filter, temporal contrast extraction filter, and orientation extraction filter could all process the auditory spectrum simultaneously, generating corresponding multi-scale features much more efficiently if implemented on different processor elements in parallel. Furthermore, feature maps could also be generated in parallel, as well as their corresponding auditory gist vectors. The ability to process data in parallel saves valuable processing time, leading to a more efficient and streamlined system for phone/syllable/vowel boundary detection in speech.

Figure 3:
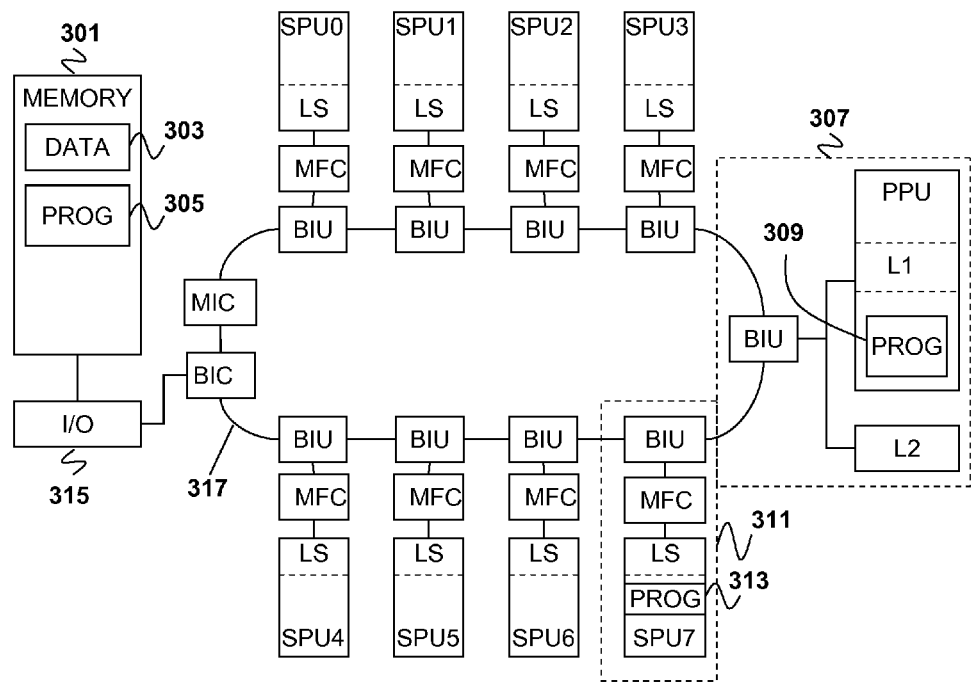
FIG. 3 is a block diagram illustrating an example of a cell processor implementation of an apparatus for syllable/vowel/phone boundary detection in speech according to an embodiment of the present invention.

One example, among others of a processing system capable of implementing parallel processing is known as a cell processor. There are a number of different processor architectures that may be categorized as cell processors. By way of example, and without limitation, FIG. 3 illustrates a type of cell processor. The cell processor 300 includes a main memory 301, a single power processor element (PPE) 307, and eight synergistic processor elements (SPE) 311. Alternatively, the cell processor may be configured with any number of SPEs. With respect to FIG. 3, the memory 301, PPE 307 and SPEs 311 can communicate with each other and with an I/O device 315 over a ring-type element interconnect bus 317. The memory 301 contains input data 303 having features in common with the input data described above and a program 305 having features in common with the program described above. At least one of the SPEs 311 may include in its local store (LS) syllable/vowel boundary detection instructions 313 and/or a portion of the input data that is to be processed in parallel, e.g. as described above. The PPE 307 may include in its L1 cache, syllable/vowel boundary detection instructions 309 having features in common with the program described above. Instructions 305 and data 303 may also be stored in memory 301 for access by the SPE 311 and PPE 307 when needed.

By way of example, and not by way of limitation, different SPE 311 may implement extraction of the multi-scale features 117. Specifically, different SPE 311 may be respectively dedicated to parallel extraction of intensity (I), frequency contrast (F), temporal contrast (T), and orientation ($O_\theta$) features from the spectrum. Similarly, different SPE 311 may respectively implement feature map generation 119 or auditory gist vector extraction 123 for the intensity (I), frequency contrast (F), temporal contrast (T), and orientation ($O_\theta$) features.

By way of example, the PPE 307 may be a 64-bit PowerPC Processor Unit (PPU) with associated caches. The PPE 307 may include an optional vector multimedia extension unit. Each SPE 311 includes a synergistic processor unit (SPU) and a local store (LS). In some implementations, the local store may have a capacity of e.g., about 256 kilobytes of memory for programs and data. The SPUs are less complex computational units than the PPU, in that they typically do not perform system management functions. The SPUs may have a single instruction, multiple data (SIMD) capability and typically process data and initiate any required data transfers (subject to access properties set up by a PPE) in order to perform their allocated tasks. The SPEs 311 allow the system to implement applications that require a higher computational unit density and can effectively use the provided instruction set. Managing a significant number of SPEs 311 by the PPE 307 allows for cost-effective processing over a wide range of applications. By way of example, the cell processor may be characterized by an architecture known as Cell Broadband Engine Architecture (CBEA). In CBEA-compliant architecture, multiple PPEs may be combined into a PPE group and multiple SPEs may be combined into an SPE group. For purposes of example, the cell processor is depicted as having only a single SPE group and a single PPE group with a single SPE and a single PPE. Alternatively, a cell processor can include multiple groups of power processor elements (PPE groups) and multiple groups of synergistic processor elements (SPE groups). CBEA-compliant processors are described in detail, e.g., in *Cell Broadband Engine Architecture*, which is available online at: http://www-306.ibm.com/chips/techlib/techlib.nsf/techdocs/1AEEE1270EA277638725706000E61B A/$file/CBEA_01_pub.pdf, which is incorporated herein by reference.

Figure 4:
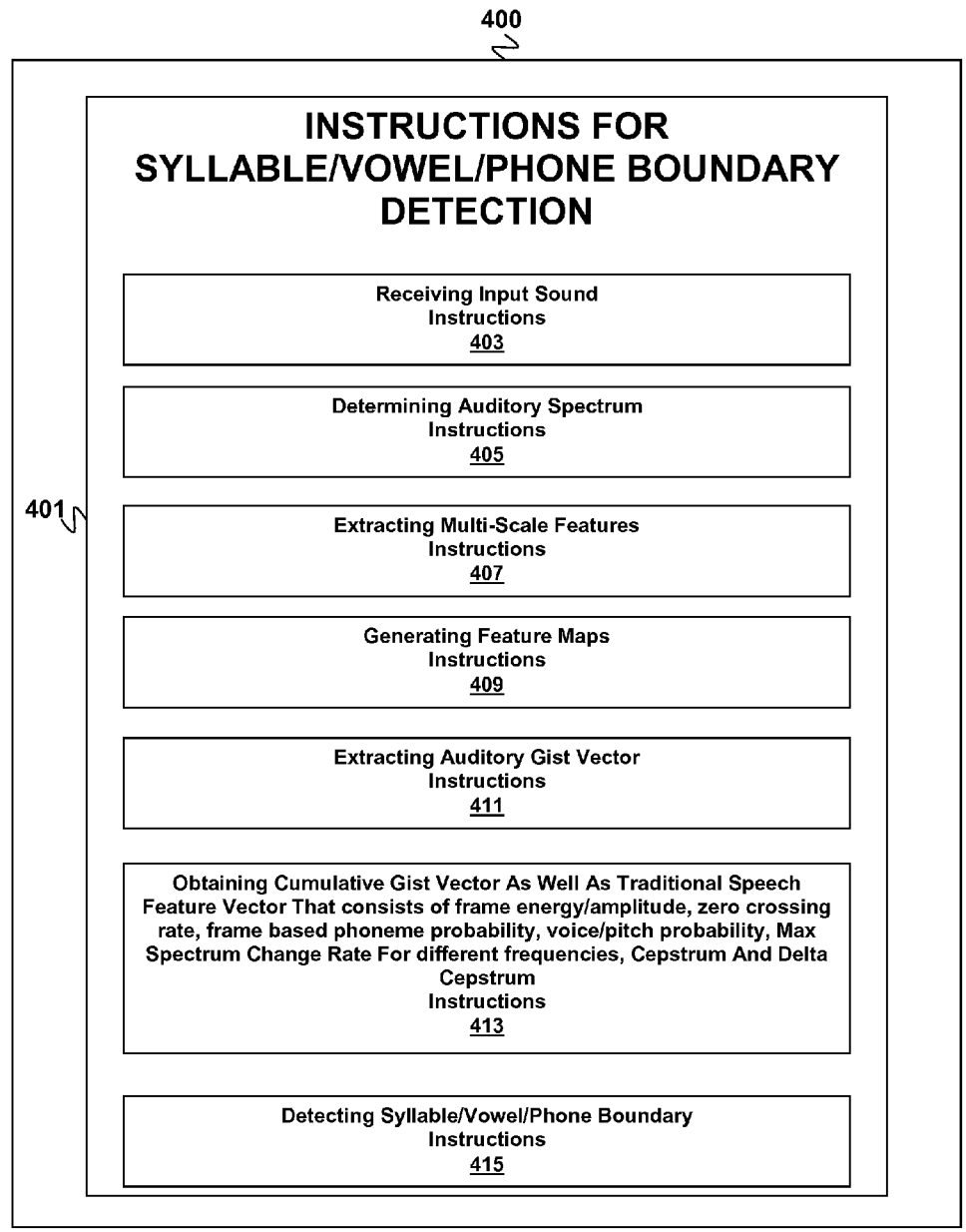
FIG. 4 illustrates an example of a non-transitory computer-readable storage medium with instructions for implementing syllable/vowel/phone boundary detection in speech recognition according to an embodiment of the present invention.

According to another embodiment, instructions for phone/syllable/vowel boundary detection using auditory attention cues may be stored in a computer readable storage medium. By way of example, and not by way of limitation, FIG. 4 illustrates an example of a non-transitory computer readable storage medium 400 in accordance with an embodiment of the present invention. The storage medium 400 contains computer-readable instructions stored in a format that can be retrieved, interpreted, and executed by a computer processing device. By way of example, and not by way of limitation, the computer-readable storage medium 400 may be a computer-readable memory, such as random access memory (RAM) or read only memory (ROM), a computer readable storage disk for a fixed disk drive (e.g., a hard disk drive), or a removable disk drive. In addition, the computer-readable storage medium 400 may be a flash memory device, a computer-readable tape, a CD-ROM, a DVD-ROM, a Blu-Ray, HD-DVD, UMD, or other optical storage medium.

The storage medium 400 contains syllable/vowel/phone boundary detection instructions 401 configured to syllable/vowel/phone boundary detection in speech using auditory attention cues. The syllable/vowel/phone boundary detection instructions 401 may be configured to syllable/vowel/phone boundary detection in accordance with the method described above with respect to FIG. 1. In particular, the syllable/vowel/phone boundary detection instructions 401 may optionally include receiving input sound instructions 403 that are used to receive an input window of sound for which syllable/vowel/phone boundary detection is to be performed. The input window of sound may be obtained in computer-readable form from a recording or from sounds captured live at run time by a microphone or microphone array. The syllable/vowel/phone boundary detection instructions 401 may further include determining auditory spectrum instructions 405 that determine an auditory spectrum for the input window of sound using cochlear filtering, inner hair cell, and lateral inhibitory processing stages as described above.

The syllable/vowel/phone boundary detection instructions 401 may also include extracting multi-scale features instructions 407 that extract multi-scale features associated with auditory spectrum when executed. These multi-scale features may include intensity, frequency contrast, temporal contrast, and orientation, as described above. This may further trigger execution of the generating feature map instructions 409 that generate corresponding feature maps for each multi-scale feature extracted as discussed above when executed. At this point, the syllable/vowel/phone boundary detection instructions 401 may implement extracting auditory gist vector instructions 411 that extract a multi-parameter auditory gist vector for each feature map when executed.

The syllable/vowel/phone boundary detection instructions 401 may additionally include obtaining cumulative gist vector instructions 413 that augment and combine all of the auditory gist vectors into a single cumulative gist vector when executed. The cumulative gist vector instructions 413 may also be configured to implement principal component analysis (PCA) to remove redundancies and reduce the dimension of the cumulative gist vector when executed. The syllable/vowel/phone boundary detection instructions 401 may further include detecting syllable/vowel/phone boundary instructions 415 that map the cumulative gist vector to its corresponding phone boundaries, vowel boundaries, syllable nucleus, or syllable boundaries when executed.

Experiments and Results

A number of syllable segmentation experiments were performed to test syllable boundary detection in accordance with an embodiment of the present invention against prior art syllable detection techniques. The TIMIT dataset was used in the syllable segmentation experiments. The TIMIT corpus doesn't have syllable annotation. The syllabification software from NIST, tsyllb2, was used for syllabifying words using their phoneme transcription. Then, the timing information for syllables was automatically extracted using the phoneme level timing information provided with the TIMIT and the phoneme sequence of each syllable. The official TIMIT train and test split was used in the experiments. The test set contains 1344 utterances, which contains approximately 17190 syllables.

In the experiments, a 3-layer neural network is used for learning the mapping between the auditory gist features and the syllable boundaries. The neural network has D inputs, (D+N)/2 hidden nodes and N output nodes, where D is the length of auditory gist vector after PCA dimension reduction when 95% of the variance is retained, and N is the number of classes, which was two in these particular experiments; i.e. boundary vs. non-boundary. The auditory gist features are estimated every 50 ms using a window that centers on the current frame to capture the context.

The exact syllable boundaries for multi-syllabic words can be ambiguous in English; i.e. it is hard to decide which consonants belong to the first or the second syllable. Hence, the experiments were conducted such that the goal was to estimate the end of syllable nucleus where usually there is a vowel-to-consonant transition. One can detect both boundaries, the beginning and the end of the syllable nucleus, using the same method; however here only the end of syllable nucleus was assumed to be a target to be detected so that only one detection per syllable existed, which was useful for estimating the number of syllables per utterance/second. Hence, in the discussion that follows, the term syllable boundary will be used to refer to the end of syllable nuclei for convenience.

The syllable boundary detection allowed for a 50 ms error margin. For example, if there was a boundary at 130 ms, the auditory gist features corresponding to the frames at 100 ms and 150 ms were both labeled as boundary during training. Similarly during evaluation, a boundary detected within 50 ms was accepted as correct.

The role of window duration W was investigated in the experiments by varying duration from 0.2 s, which was the mean syllable duration, up to 0.4 s to analyze the effect of neighboring left and right context on the performance. Selected grid size determines the temporal and spectral resolution. Different grid sizes were tested for auditory gist extraction for varying the temporal and spectral resolution. It was found that a grid size of 4-by-10 is sufficient and performs well in syllable boundary detection with a reasonable feature dimension. In addition, it was found that increasing the spectral resolution can further improve the results; while increasing the complexity, as well Frame-level syllable boundary detection performance for varying window duration are presented together with the auditory gist dimension D in Table I below. Increasing the window duration improves syllable boundary detection performance, indicating that contextual information helps for boundary detection. The best performance achieved is 85.32% syllable boundary detection accuracy at frame-level with W=0.4 s. The results reported in Table I below are original neural network output scores. Indeed, the actual frame-level accuracy is higher since detecting one of the frames for each syllable boundary is sufficient; i.e. neural network expects a boundary both frames at 100 ms and 150 ms if a reference syllable boundary is at 130 ms, otherwise penalizes non-detected frame as deletion error.

TABLE I

| W(s) | D  | Accuracy | Precision | Recall | F-score |
|------|----|----------|-----------|--------|---------|
| 0.2  | 24 | 82.23    | 75.4      | 84.1   | 79.5    |
| 0.3  | 33 | 84.04    | 78.7      | 83.6   | 81.1    |
| 0.4  | 72 | 85.32    | 81.6      | 82.8   | 82.2    |

Embodiments of the present invention exhibit certain differences and advantages over the prior art. Specifically, unlike the prior art, which utilizes short-term acoustic features such as energies in critical bands, linear predictive coding spectra, sub band-based correlation, pitch, voicing, etc, embodiments of the invention use auditory attention cues for syllable segmentation. Traditional methods require parameter tuning which make them specific to a certain data and setting. In embodiments of the present invention, by contrast, the model does not require parameter tuning.

Furthermore, embodiments of the present invention obtain frame-level results such that for each frame there is a probability of the current frame being a syllable boundary. The prior art, by contrast, aims for detecting a peak around the syllable nucleus; e.g., from about 50 ms before the beginning of the nucleus to about 50 ms after the end of the nucleus; hence allows a larger error margin. Embodiments of the present invention can obtain more detailed information at the frame level. Embodiments of the present invention can also provide information about the number of syllables in a segment; e.g., the number of syllables per second or per utterance, which can be used for estimating a speaking rate. The estimated speaking rate can be used to improve other spoken language processing applications such as; to improve speech recognition performance by selecting appropriate acoustic models based on the speech rate, or finding emotional segments of speech, etc.

For comparison with other methods, syllable nuclei detection experiments were also conducted and syllable level results were also obtained. First a neural network was trained such that the frame/s corresponding to the middle of syllable nuclei are labeled as targets to be detected. Then, a soft decision was used such that, the neural network probability score is used to create a one dimensional curve as a function of time. Then a peak search was performed on the curve to locate local maxima which are counted as detected syllable nuclei. As done in the other methods, a 50 ms error was tolerated around syllable nuclei if needed. The results are presented in Table II along with the state-of-the art results from the following references in the literature:

"Robust Speech Rate Estimation for Spontaneous Speech", Dagen Wang and Shrikanth S. Narayanan, in IEEE TRANSACTIONS ON AUDIO, SPEECH, AND LANGUAGE PROCESSING, VOL. 15, NO. 8, NOVEMBER 2007, pp 2190-2201, which is incorporated herein by reference.

"Speech rhythm guided syllable nuclei detection", Y. Zhang and J. Glass, Proceedings of the IEEE International Conference on Acoustics, Speech, and Signal Processing, pp 3797-3800, Taipei, Taiwan April 2009, which is incorporated herein by reference.

One can refer to F-score in Table II below for comparison since the other methods fine tuned their parameters to obtain best Recall and best Precision, which cannot be obtained simultaneously at a given time, whereas F-score, which is equal to $$2\sqrt{\frac{Precision \times Recall}{Precision + Recall}},$$

considers both Precision and Recall at a given time.

TABLE II

| Method | Recall | Precision | F-score |
| --- | --- | --- | --- |
| TCSSC [Dagen et al] | 86.06 | 99.69 | 90.21 |
| nRG [Zhang et al] | 79.97 | 99.84 | 88.58 |
| RG [Zhang et al] | 86.54 | 98.86 | 92.07 |
| Attention Features | 92.60 | 93.55 | 93.07 |

The results from Table II above show that syllable detection in accordance with embodiments of the present invention performs as good as or better than the state-of-the art on the syllable nucleus detection.

While the above is a complete description of the preferred embodiment of the present invention, it is possible to use various alternatives, modifications, and equivalents. Therefore, the scope of the present invention should be determined not with reference to the above description, but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. In the claims that follow, the word "or" is to be interpreted as a non-exclusive or, unless otherwise specified. The appended claims are not to be interpreted as including means-plus-function limitations, unless such a limitation is explicitly received in a given claim using the phrase "means for".

What is claimed is:

1. A method, comprising:
   extracting one or more multi-scale features from an auditory spectrum for an input window of sound, wherein each multi-scale feature is extracted using a separate two-dimensional spectro-temporal receptive filter;
   generating one or more feature maps corresponding to the one or more multi-scale features;
   extracting an auditory gist vector from each of the one or more feature maps;
   obtaining a cumulative gist vector through augmentation of each auditory gist vector extracted from the one or more feature maps;
   detecting one or more syllable or vowel or phone boundaries in the input window of sound by mapping the cumulative gist vector to one or more syllable or vowel or phone boundaries; and
   determining a number of syllables per unit time or a number of syllables per utterance using the one or more syllable or vowel or phone boundaries in the input window of sound.

2. The method of claim 1, further comprising extracting a lexical or grammatical meaning from a recognized vowel or syllable or phone using a detected syllable or vowel or phone boundary.

3. The method of claim 2, further comprising displaying or storing the lexical or grammatical meaning.

4. The method of claim 1, further comprising estimating a speaking rate from the determined number of syllables per unit time or the number of syllables per utterance.

5. The method of claim 1, further comprising estimating a speaking rate from the determined number of syllables per unit time or the number of syllables per utterance and using the estimated speaking rate to improve another spoken language processing application.

6. The method of claim 1, further comprising estimating a speaking rate from the determined number of syllables per unit time or the number of syllables per utterance and using the estimated speaking rate to improve speech recognition performance by selecting an appropriate acoustic model based on the estimated speaking rate.

7. The method of claim 1, further comprising estimating a speaking rate from the determined number of syllables per unit time or the number of syllables per utterance and using the estimated speaking rate to find one or more emotional segments of speech within a signal that includes the input window of sound.

8. The method of claim 1 wherein detecting one or more syllable or vowel or phone boundaries in the input window of sound includes generating a binary decision or a probability score to determine if a current frame contains a boundary given one or more auditory attention features in the cumulative gist vector.

9. The method of claim 1, further comprising determining the auditory input spectrum, wherein determining the auditory spectrum involves passing the input window of sound through a cochlear filtering stage, inner hair cell stage, and lateral inhibitory stage that mimic transmission between the basilar membrane and the cochlear nucleus of an auditory system.

10. The method of claim 9, wherein the cochlear filtering stage is implemented using a bank of 128 overlapping constant-Q asymmetric band-pass filters.

11. The method of claim 1, wherein one of the multi-scale features in the auditory spectrum for an input window of sound characterizes intensities associated with the auditory spectrum.

12. The method of claim 11, wherein one of the multi-scale features in the auditory spectrum for an input window of sound characterizes frequency contrast associated with the auditory spectrum.

13. The method of claim 12, wherein one of the multi-scale features in the auditory spectrum for an input window of sound characterizes temporal contrast associated with the auditory spectrum.

14. The method of claim 13, wherein one of the multi-scale features in the auditory spectrum for an input window of sound characterizes orientations associated with the auditory spectrum.

15. The method of claim 1, wherein the one or more multi-scale features in the auditory spectrum for an input window of sound are obtained using a dyadic pyramid.

16. The method of claim 1, wherein each feature map in the one or more feature maps is obtained by computing differences between one or more center scales associated with that particular multi-scale feature and one or more surround scales associated with that particular multi-scale feature.

17. The method of claim 1, wherein each auditory gist vector is determined by dividing its corresponding feature map into an m-by-n grid of sub-regions and calculating statistics for each sub-region.

18. The method of claim 1, wherein additional speech features are used in combination with gist vector to form a bigger input vector for dimension reduction.

19. The method of claim 18, wherein the additional speech features include frame based energy, frame based maximum amplitude, frame based zero crossing rate, frame based phoneme probability, frame based probability of being voice signal with pitch vibration, or frame based spectrum change rate calculated by each FFT frequency bin.

20. The method of claim 1, wherein obtaining the cumulative gist vector includes using a dimension reduction method to remove redundancies or reduce dimensions of the cumulative gist vector.

21. An apparatus, comprising:
a processor;
a memory; and
computer coded instructions embodied in the memory and executable by the processor, wherein the computer coded instructions are configured to implement a method for syllable/vowel/phone boundary detection, the method comprising:
extracting one or more multi-scale features from an auditory spectrum for an input window of sound, wherein each multi-scale feature is extracted using a separate two-dimensional spectro-temporal receptive filter;
generating one or more feature maps corresponding to the one or more multi-scale features;
extracting an auditory gist vector from each of the one or more feature maps;
d) obtaining a cumulative gist vector through augmentation of each auditory gist vector extracted from the one or more feature maps;
detecting one or more syllable or vowel or phone boundaries in the input window of sound by mapping the cumulative gist vector to one or more syllable or vowel or phone boundaries; and
determining a number of syllables per unit time or a number of syllables per utterance using the one or more syllable or vowel or phone boundaries in the input window of sound.

22. A computer program product comprising:
a non-transitory, computer-readable storage medium having computer readable program code embodied therein, said computer program code having:
computer readable program code configured to extract one or more multi-scale features from an auditory spectrum for an input window of sound when executed, wherein each multi-scale feature is extracted using a separate two-dimensional spectro-temporal receptive filter;
computer readable program code configured to generate one or more feature maps corresponding to the one or more multi-scale features when executed;
computer readable program code configured to extract an auditory gist vector from each of the one or more feature maps when executed;
computer readable program code configured to obtain a cumulative gist vector through augmentation of each of the auditory gist vectors when executed;
computer readable program code configured to detect one or more syllable or vowel or phone boundaries in the input window of sound by mapping each cumulative gist vector extracted from the one or more feature maps to one or more syllable or vowel or phone boundaries; and
computer readable program code configured to determine a number of syllables per unit time or a number of syllables per utterance using the one or more syllable or vowel or phone boundaries in the input window of sound when executed.

\* \* \* \* \*